Patented Oct. 20, 1953

2,656,362

UNITED STATES PATENT OFFICE 2,656,362

PREPARATION OF 2-HALOGENATED TETRAHYDROTHIOPHENE 1,1-DIOXIDES

Herman Eldridge Faith, Indianapolis, Ind., assignor to Allied Laboratories, Inc., Kansas City, Mo., a corporation of Delaware No Drawing. Application July 5, 1951,
Serial No. 235,390

4 Claims. (Cl. 260—332.1)

The present invention relates to 2-halogenated tetrahydrothiophene 1,1-dioxides and methods for their preparation.

The compounds of my invention are represented by the following general formula:

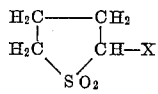

wherein X represents a halogen selected from the group consisting of bromine, chlorine and iodine and methods for the preparation.

The 2-halogenated tetrahydrothiophene 1,1-dioxides possess some desirable pharmacological properties and are useful as intermediates in the preparation of other new compounds.

In general, they may be prepared by reacting anhydrous tetrahydrothiophene 1,1-dioxide with the appropriate anhydrous ethylmagnesium halide and then subsequently halogenating with the desired halide.

The invention will be more fully illustrated by the following example:

Preparation of 2-bromotetrahydrothiophene 1,1-dioxide

Ethylmagnesium bromide is made from 6 gm. of ethyl bromide and 1.32 gm. of magnesium in 75 cc. of anhydrous ether. To this solution is added anhydrous tetrahydrothiophene 1,1-dioxide (5.4 gm.) in 60 cc. of dry benzene. The temperature is adjusted to 20° C. at this time. As the evolution of ethane gradually diminishes, the stirred mixture is heated gradually to its boiling point where it is maintained for one-half hour. The mixture is cooled to 20°–25° C. and is maintained at that temperature as 8.6 gm. of bromide in 20 cc. of benzene are added portionwise until the bromine color persists in the mixture. Excess bromine is removed by shaking the solution with a small amount of sodium bisulfite solution. The ether-benzene solution is extracted with three portions of water and dried over anhydrous magnesium sulfate. The solution is then filtered and concentrated under reduced pressure. The residue distills at 130–140° C. at 2–3 mm. pressure. Partial decomposition occurs during the distillation. Crystallization of the distillate from an ethyl ether-petroleum ether mixture gives pure 2-bromotetrahydrothiophene 1,1-dioxide, melting at 30 to 31.5° C.

2-iodotetrahydrothiophene 1,1-dioxide and 2-chlorotetrahydrothiophene 1,1-dioxide may be made by essentially the same process used in preparing 2-bromotetrahydrothiophene 1,1-dioxide. That is by reacting ethylmagnesium iodide or ethyl magnesium chloride with tetrahydrothiophene 1,1-dioxide and then treating the iodide mixture with iodine or the chloride mixture with chlorine.

In the foregoing example, it is shown that my invention comprises a process for the preparation of 2-halogenated tetrahydrothiophene 1,1-dioxides which comprises the steps of reacting anhydrous tetrahydrothiophene 1,1-dioxide with a substance selected from the group consisting of ethyl magnesium iodide, ethyl magnesium bromide and ethyl magnesium chloride in an anhydrous liquid medium and subsequently adding a halogen of the group consisting of iodine, bromine, and chlorine.

I claim:

1. A process for the preparation of 2-halogenated tetrahydrothiophene 1,1-dioxides which comprises the steps of reacting anhydrous tetrahydrothiophene 1,1-dioxide with a substance selected from the group consisting of ethyl magnesium iodide, ethyl magnesium bromide and ethyl magnesium chloride in an anhydrous liquid medium and subsequently adding a halogen of the group consisting of iodine, bromine, and chlorine.

2. A process for producing 2-bromotetrahydrothiophene 1,1-dioxide which comprises reacting tetrahydrothiophene 1,1-dioxide with ethyl magnesium bromide in an anhydrous liquid medium and subsequently adding bromine and recovering 2-bromotetrahydrothiophene, 1,1-dioxide from the reaction mixture.

3. A process for producting 2-iodotetrahydrothiophene 1,1-dioxide which comprises reacting tetrahydrothiophene 1,1-dioxide with ethyl magnesium iodide in an anhydrous liquid medium and subsequently adding iodine and recovering 2-iodotetrahydrothiophene 1,1-dioxide from the reaction mixture.

4. A process for producing 2-chlorotetrahydrothiophene 1,1-dioxide which comprises reacting tetrahydrothiophene 1,1-dioxide with ethyl magnesium chloride in an anhydrous liquid medium and subsequently adding chlorine and recovering 2-chlorotetrahydrothiophene 1,1-dioxide from the reaction mixture.

HERMAN ELDRIDGE FAITH.

References Cited in the file of this patent

UNITED STATES PATENTS

| Number | Name | Date |
| --- | --- | --- |
| 2,452,949 | Morris et al. | Nov. 2, 1948 |
| 2,460,233 | Morris et al. | Jan. 25, 1949 |

FOREIGN PATENTS

| Number | Country | Date |
| --- | --- | --- |
| 566,930 | Great Britain | Jan. 19, 1945 |